(12) United States Patent
Lee (10) Patent No.: US 11,470,849 B2
(45) Date of Patent: Oct. 18, 2022

(54) LIFTABLE BAKING NET STRUCTURE FOR OVEN

(71) Applicant: Foshan Juguan Metal Manufacturing Co., Ltd., Foshan (CN)

(72) Inventor: Jiebo Lee, Foshan (CN)

(73) Assignee: Foshan Juguan Metal Manufacturing Co., Ltd.

( * ) Notice: Subject to any disclaimer, the term of this patent is extended or adjusted under 35 U.S.C. 154(b) by 448 days.

(21) Appl. No.: 16/578,497

(22) Filed: Sep. 23, 2019

(65) Prior Publication Data
US 2021/0022348 A1    Jan. 28, 2021

(30) Foreign Application Priority Data

Jul. 26, 2019 (CN) .......................... 201921206880.2

(51) Int. Cl.
*F24C 15/16* (2006.01)
*A21B 1/50* (2006.01)
*A21B 3/15* (2006.01)
*A21B 3/00* (2006.01)

(52) U.S. Cl.
CPC .................. *A21B 1/50* (2013.01); *A21B 3/00* (2013.01); *A21B 3/15* (2013.01); *F24C 15/16* (2013.01)

(58) Field of Classification Search
CPC .... A21B 1/50; A21B 3/00; A21B 3/15; F24C 15/16; F24C 15/168; A47J 37/0704; A47J 37/1219; B66F 15/00
See application file for complete search history.

(56) References Cited

U.S. PATENT DOCUMENTS

| | | | | |
|---|---|---|---|---|
| 1,137,130 A | * | 4/1915 | Green .................. | A47J 27/0813 312/272.5 |
| 1,796,033 A | * | 3/1931 | Lee ......................... | F24B 1/202 D7/332 |
| 2,114,697 A | * | 4/1938 | Babin ..................... | A47J 37/06 126/41 R |
| 2,158,020 A | * | 5/1939 | Hruskafrank .......... | A47B 17/02 108/106 |
| 2,541,528 A | * | 2/1951 | Mcavoy .................. | F24B 1/202 312/351.3 |
| 2,672,385 A | * | 3/1954 | Segal ....................... | A47B 9/20 108/106 |
| 2,672,386 A | * | 3/1954 | Segal ..................... | A47B 31/00 108/147 |
| 2,739,864 A | * | 3/1956 | Saunders ................ | F25D 25/02 312/334.4 |
| 2,792,944 A | * | 5/1957 | Drommer ................ | A47B 9/02 108/147.22 |
| 2,842,044 A | * | 7/1958 | Kirk .................... | A47J 37/0704 99/421 H |
| 3,121,386 A | * | 2/1964 | Persinger ............ | A47J 37/0704 99/446 |

(Continued)

*Primary Examiner* — Jorge A Pereiro (57) ABSTRACT

A liftable baking net structure for an oven includes an inner housing, a lifting support mounted inside the inner housing, and a connecting rod mechanism mounted outside the inner housing. A vertical first guide groove is opened in a side wall of the inner housing. The connecting rod mechanism is connected to the lifting support via a connecting member passing through the first guide groove. The connecting rod mechanism drives the lifting support to move vertically along the first guide groove in the housing.

7 Claims, 5 Drawing Sheets

(56) References Cited

U.S. PATENT DOCUMENTS

| | | | | |
|---|---|---|---|---|
| 3,364,913 A | * | 1/1968 | Borglum | A47J 37/0704 |
| | | | | 126/25 A |
| 3,455,233 A | * | 7/1969 | Cable | A47J 37/0704 |
| | | | | 99/446 |
| 3,679,274 A | * | 7/1972 | Nance | A47B 88/402 |
| | | | | 312/334.36 |
| 3,751,126 A | * | 8/1973 | Hudson | A47B 88/49 |
| | | | | 312/334.44 |
| 5,660,777 A | * | 8/1997 | Herrmann | B29C 45/14434 |
| | | | | 264/154 |
| 5,735,589 A | * | 4/1998 | Herrmann | B29C 33/123 |
| | | | | 312/334.44 |
| 2002/0179080 A1 | * | 12/2002 | Poe, Jr. | A47J 37/074 |
| | | | | 126/41 R |

* cited by examiner

LIFTABLE BAKING NET STRUCTURE FOR OVEN

PRIORITY INFORMATION

Pursuant to 35 U.S.C. § 119 (a), this application claims the benefit of earlier filing date and right of priority to Chinese Patent Application Number 201921206880.2, filed on Jul. 26, 2019, The entire content of Chinese Patent Application Number 201921206880.2, filed on Jul. 26, 2019 is hereby incorporated by reference.

TECHNICAL FIELD

The present disclosure relates to the field of oven technologies, and more particularly, to a liftable baking net structure for an oven.

BACKGROUND

In an existing electric oven, a heating assembly is usually disposed at an upper portion of the body of the oven, and a baking net or a baking tray is placed at a fixed position below the heating assembly. The heating assembly bakes food placed on the baking net. According to the heat transfer principle, the temperature gets higher at a position closer to the heating assembly. However, due to the different amount and volume of food baked by the user each time, a mounting position of the baking net can only be designed in a relatively general position, resulting in a decrease in the thermal energy use efficiency of the heating assembly.

To overcome the deficiency in the existing electric oven, the present disclosure provides a liftable baking net structure that is convenient to use and improves the thermal energy use efficiency.

A liftable baking net structure for an oven, which comprises: an inner housing, having a vertical first guide groove opened in a side wall of the inner housing; a lifting support mounted inside the inner housing; and a connecting rod mechanism mounted outside the inner housing, wherein the connecting rod mechanism is connected to the lifting support via a connecting member passing through the first guide groove, and the connecting rod mechanism drives the lifting support to move vertically along the first guide groove in the housing.

As an improvement to the foregoing technical solution, the connecting rod mechanism includes a fixed member and a connecting rod, an end of the connecting rod is connected to the fixed member, and the connecting rod swings up and down around the end; and a second guide groove is opened in the connecting rod in a long side direction of the connecting rod, one end of the connecting member is connected to the lifting support, and the other end of the connecting member is movably connected to the second guide groove.

As a further improvement to the foregoing technical solution, a roller is disposed between the connecting member and the second guide groove, the roller is connected to the connecting member through a connecting plate, and the roller is clamped in the second guide groove.

Further, the liftable baking net structure further includes a positioning mechanism, wherein the positioning mechanism includes a rod-shaped handle and a positioning plate, a positioning groove is opened in the positioning plate along a swing path of the connecting rod, the handle passes through the positioning groove to be connected to the connecting rod, and the handle is clampable at any position in the positioning groove.

Further, two lateral sides of the positioning groove have a wave form and are symmetrical, the handle includes a fixed rod and a telescopic rod, the fixed rod is fixedly connected to the connecting rod, an end of the telescopic rod is movably connected to the fixed rod to perform telescopic movement, the telescopic rod includes at least a first and second shaft sections I, II with different shaft diameters, the shaft diameter of the first shaft section I is less than a minimum distance between the two lateral sides of the positioning groove, and the shaft diameter of the second shaft section II is greater than the minimum distance between the two lateral sides of the positioning groove and is less than a maximum distance between the two lateral sides of the positioning groove.

Further, a third guide groove and a limiting member are provided at a connection between the fixed rod and the telescopic rod, and the limiting member penetrates and is fixed in the telescopic rod and slides in the third guide groove.

Further, the first guide groove is respectively opened in each of both sides of the inner housing, and the connecting rod mechanism is respectively mounted on each of both sides outside the inner housing.

Further, the fixed member is a rotating rod which is rotatably mounted behind the inner housing, and the connecting rods of the connecting rod mechanisms on the two sides are fixedly connected to the rotating rod to enable the connecting rod on the two sides to synchronously swing.

Further, the liftable baking net structure further includes a baking tray support, wherein a fourth guide groove is opened in two sides of the baking tray support, the lifting support includes a guiderail bar, the guiderail bar is disposed facing a front end surface of the inner housing, a limiting post is disposed on the guiderail bar, and the baking tray support is movably connected to the guiderail bar via a cooperation between the fourth guide groove and the limiting post.

Further, a clamp head is disposed at an upper portion of the limiting post, a width of the clamp head is greater than that of the fourth guide groove, a wide hole is provided in a front end of the fourth guide groove, and a width of the wide hole is greater than that of the clamp head.

The beneficial effect of the present disclosure is as follows: when the liftable baking net structure for an oven is used, a baking net or a baking tray is placed in a cavity of the inner housing and held on the lifting support, and according to different food that needs to be baked, the connecting rod mechanism is used to drive the lifting support to drive the baking net to move vertically in the cavity, so that the baking net rises to approach a heating assembly, thereby improving the thermal energy use efficiency. The baking net is lowered after the food is done and therefore can be conveniently removed, thus facilitating the use.

BRIEF DESCRIPTION OF THE DRAWINGS

The drawings are only for purposes of illustrating various embodiments and are not to be construed as limiting, wherein.

DETAILED DESCRIPTION OF THE DRAWINGS

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, and are only used to explain the present disclosure but should not be construed as a limitation to the present disclosure.

Figure 1:
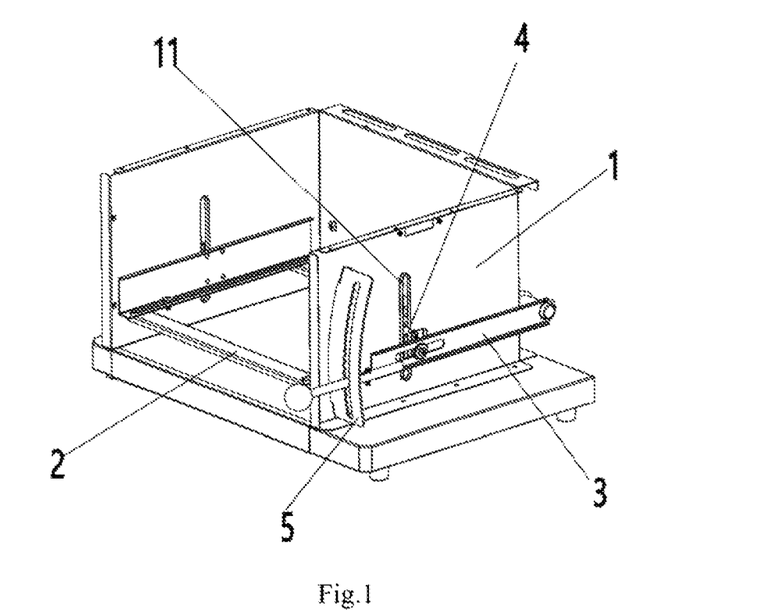
FIG. 1 is a schematic structural diagram according to the present disclosure.
Figure 2:
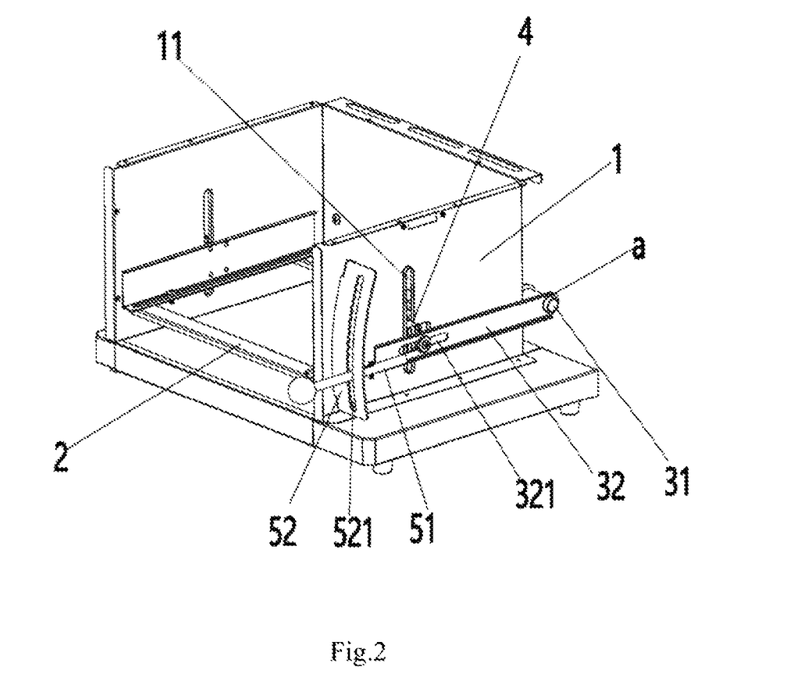
FIG. 2 is a schematic structural diagram according to the present disclosure.
Figure 3:
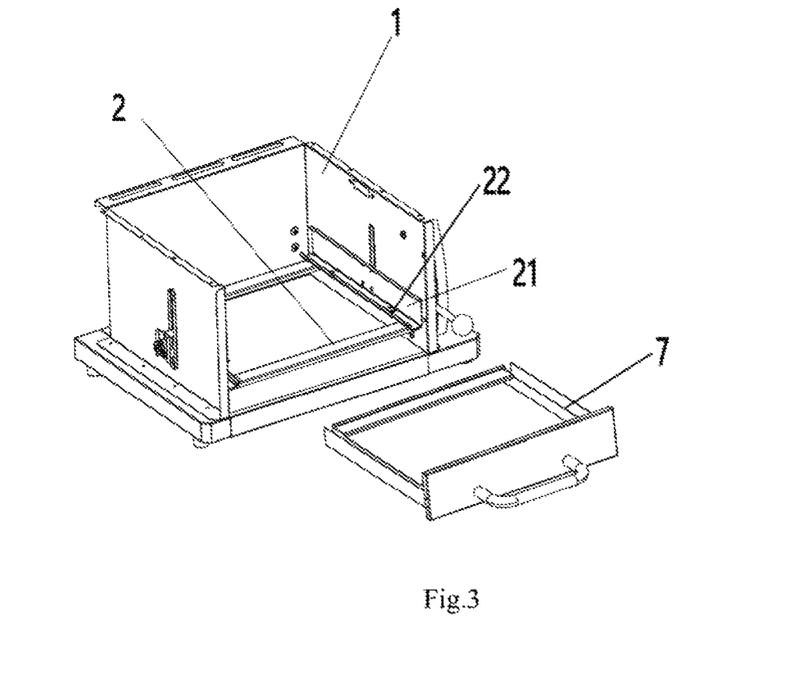
FIG. 3 is a schematic structural diagram according to the present disclosure.

Referring to FIG. 1, FIG. 2, and FIG. 3, a liftable baking net structure for an oven includes an inner housing 1, a lifting support 2 mounted inside the inner housing 1, and a connecting rod mechanism 3 mounted outside the inner housing 1. A vertical first guide groove 11 is opened in a side wall of the inner housing 1. The connecting rod mechanism 3 is connected to the lifting support 2 via a connecting member 4 passing through the first guide groove 11. The connecting rod mechanism 3 drives the lifting support 2 to move vertically along the first guide groove 11 in the housing. In this embodiment, the liftable baking net structure is applied to an oven. A heating assembly of the oven is mounted at the top of the inner housing 1. The connecting member 4 may be a screw rod, a bolt, or the like. During use, a baking net or a baking tray is placed in a cavity of the inner housing 1 and is held on the lifting support 2, and according to different food that needs to be baked, the connecting rod mechanism 3 is used to drive the lifting support 2 to bring the baking net to move vertically in the cavity, so that the baking net rises to approach the heating assembly, thereby improving the thermal energy use efficiency. The baking net is lowered after the food is done and therefore can be conveniently removed, thus facilitating the use.

The connecting rod mechanism 3 includes a fixed member 31 and a connecting rod 32, an end a of the connecting rod 32 is connected to the fixed member 31, and the connecting rod 32 swings up and down around the end a. A second guide groove 321 is opened in the connecting rod 32 in a long side direction of the connecting rod 32, one end of the connecting member 4 is connected to the lifting support 2, and the other end of the connecting member 4 is movably connected to the second guide groove 321. The connecting rod 32 swings up and down to push the connecting member 4 to move up and down along the first guide groove 11, so as to drive the lifting support 2 to move vertically.

Figure 4:
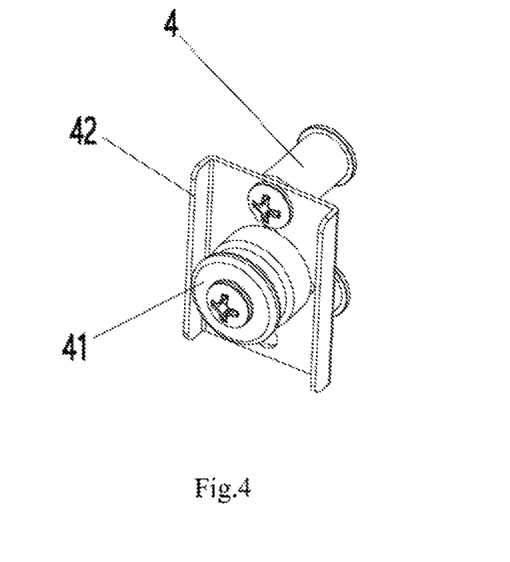
FIG. 4 is a schematic diagram showing assembling of a connecting member and a roller according to the present disclosure.

Referring to FIG. 4, preferably, a roller 41 is disposed between the connecting member 4 and the second guide groove 321, the roller 41 is connected to the connecting member 4 through a connecting plate 42, and the roller 41 is clamped in the second guide groove 321. When the connecting rod 32 swings to push the connecting member 4 to move, the roller 41 operates to avoid direct friction between the connecting member 4 and the second guide groove 321.

Referring to FIG. 1, FIG. 2, FIG. 3, FIG. 5, and FIG. 6, the liftable baking net structure further includes a positioning mechanism 5. The positioning mechanism 5 includes a rod-shaped handle 51 and a positioning plate 52. A positioning groove 521 is opened in the positioning plate 52 along a swing path of the connecting rod 32. The handle 51 passes through the positioning groove 521 to be connected to the connecting rod 32. The handle 51 is clampable at any position in the positioning groove 521. A user may directly pull the handle 51 up and down, and the handle 51 drives the connecting rod 32 to swing up and down. When the lifting support 2 rises or lowers to a certain height, the lifting support 2 is clamped in the positioning groove 521 through the handle 51, thereby being fixed at a current position.

Figure 5:
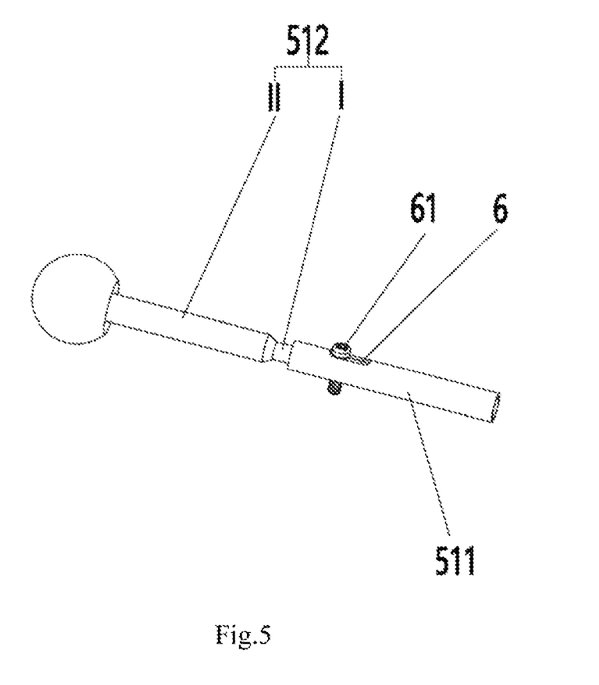
FIG. 5 is a schematic structural diagram of a handle according to the present disclosure.
Figure 6:
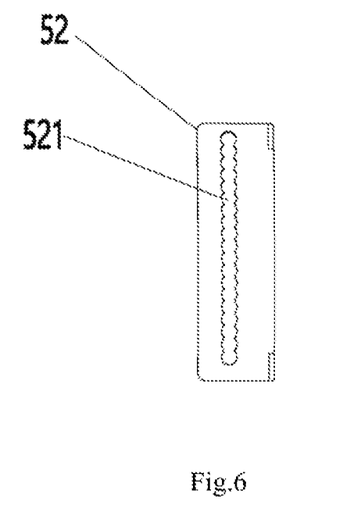
FIG. 6 is a schematic structural diagram of a positioning plate according to the present disclosure.

Preferably, two lateral sides of the positioning groove 521 have a wave form and are symmetrical. The handle 51 includes a fixed rod 511 and a telescopic rod 512. The fixed rod 511 is fixedly connected to the connecting rod 32. An end of the telescopic rod 512 is movably connected to the fixed rod 511 to perform telescopic movement. The telescopic rod 512 includes a first and second shaft sections I, II with different shaft diameters. The shaft diameter of the first shaft section I is less than a minimum distance between the two lateral sides of the positioning groove 521. The shaft diameter of the second shaft section II is greater than the minimum distance between the two lateral sides of the positioning groove 521 and is less than a maximum distance between the two lateral sides of the positioning groove 521. When the connecting rod 32 needs to be swung, the handle 51 is pulled to pull the first shaft section I of the telescopic rod 512 of the handle 51 into the positioning groove 521. The handle 51 is swung to make the first shaft section I move in the positioning groove 521. When the lifting support 2 moves to a desired position, the telescopic rod 512 is pulled again to enable the second shaft section II to be clamped into and fixed between the waves of the positioning groove 521. In this way, the lifting support 2 is positioned at the current position.

A third guide groove 6 and a limiting member 61 are provided at a connection between the fixed rod 511 and the telescopic rod 512. The limiting member 61 penetrates and is fixed in the telescopic rod 512 and slides in the third guide groove 6. The limiting member 61 may be a bolt or the like. The limiting member 61 moves in the third guide groove 6 to limit the telescopic travel of the telescopic rod 512.

Figure 7:
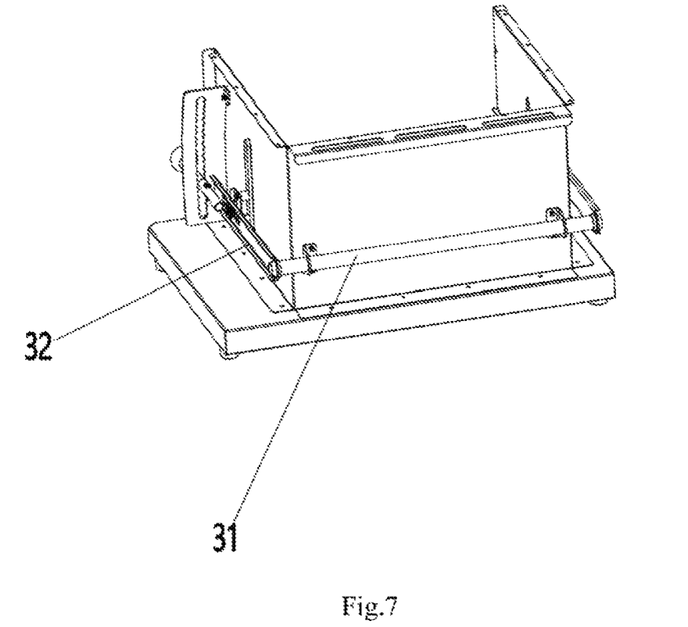
FIG. 7 is a schematic structural diagram of a rear portion according to the present disclosure.

Referring to FIG. 7, preferably, the first guide groove 11 is respectively opened in each of both sides of the inner housing 1. The connecting rod mechanism 3 is respectively mounted on each of both sides outside the inner housing 1. The two connecting rod mechanisms 3 are used to enable two sides of the baking net to be held on the lifting supports 2 on two sides under equal forces, thereby ensuring the movement stability of the baking net.

Specifically, the fixed member 31 is a rotating rod. The rotating rod is rotatably mounted behind the inner housing 1. The connecting rods 32 of the connecting rod mechanisms 3 on the two sides are fixedly connected to the rotating rod to enable the connecting rod 32 on the two sides to synchronously swing. During use, only the connecting rod 32 on one side needs to be swung to enable the connecting rod 32 on the other side to synchronously swing in linkage through the rotating rod, thus ensuring the simultaneous movement of the lifting supports 2 on the two sides.

Figure 8:
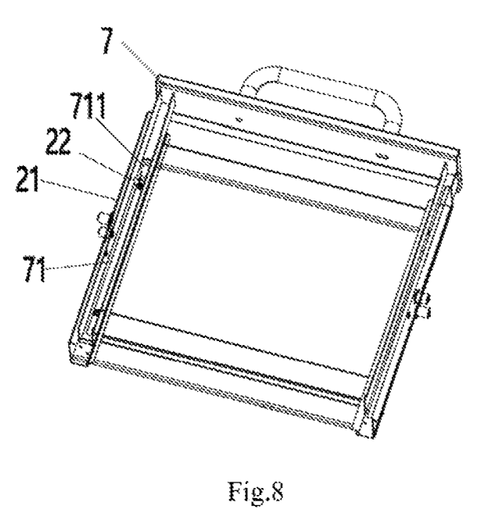
FIG. 8 is a schematic diagram showing assembling of a baking tray support and a guiderail bar according to the present disclosure.
Figure 9:
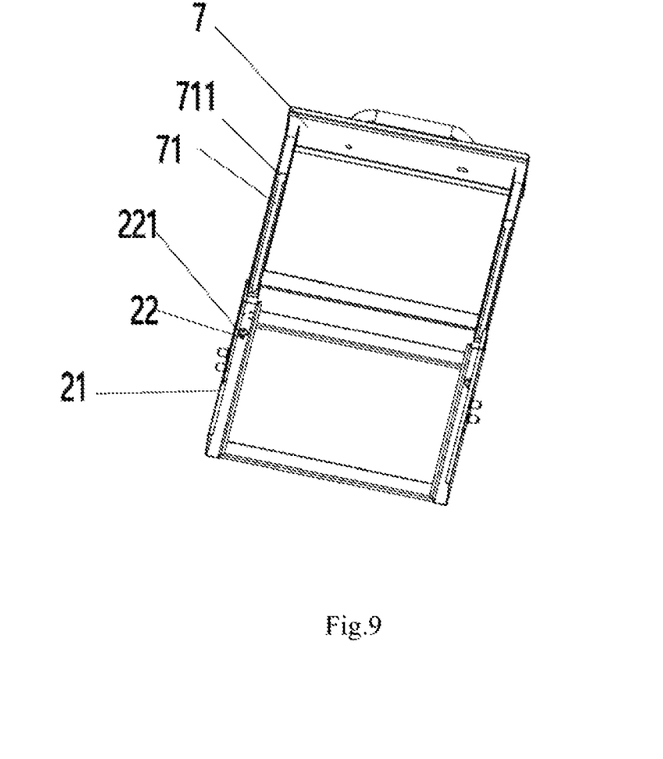
FIG. 9 is a schematic structural exploded view of a baking tray support and a guiderail bar according to the present disclosure.

Referring to FIG. 3, FIG. 8, and FIG. 9, the liftable baking net structure further includes a baking tray support 7 on which the baking net or the baking tray may be placed for use. A fourth guide groove 71 is opened in two sides of the baking tray support 7. The lifting support 2 includes a guiderail bar 21. The guiderail bar 21 is disposed facing a front end surface of the inner housing 1. A limiting post 22 is disposed on the guiderail bar 21. The baking tray support 7 is movably connected to the guiderail bar 21 via cooperation between the fourth guide groove 71 and the limiting post 22. The baking tray support 7 is pulled or pushed like a drawer. During the pulling and pushing, the limiting post 22 is clamped in the fourth guide groove 71 to ensure the stability of pulling and pushing.

Preferably, a clamp head 221 is disposed at an upper portion of the limiting post 22. The clamp head 221 has a width greater than that of the fourth guide groove 71. A wide hole 711 is provided in a front end of the fourth guide groove 71. The wide hole 711 has a width greater than that of the clamp head 221. In this embodiment, the limiting post 22 may be a screw. When the baking tray support 7 is normally pulled and pushed for use, the fourth guide groove 71 and limiting post 22 cooperate to limit a movement travel of pulling or pushing the baking tray support 7, and at the same time the clamp head 211 is used to prevent the baking tray support 7 from leaving the guiderail bar 21. When the baking tray support 7 needs to be completely removed from the inner housing 1, the baking tray support 7 is moved to align the wide hole 711 with the limiting post 22, and the baking tray support 7 is then pulled up to enable the limiting post 22 to leave the fourth guide groove 71, thus allowing the baking tray support 7 to leave the guiderail bar 21 to completely remove the entire baking tray support 7 from the inner housing 1.

Although the embodiments of the present disclosure have been shown and described above, it may be understood that the foregoing embodiments are examples and cannot be construed as limitations to the present disclosure. A person of ordinary skill in the art may make changes, modifications, replacements, and variations to the foregoing embodiments within the scope of the present disclosure.

What is claimed is:

1. A liftable baking net structure for an oven, comprising:
an inner housing, having a vertical first guide groove opened in a side wall of said inner housing;
a lifting support mounted inside said inner housing;
a connecting rod mechanism mounted outside the inner housing;
said connecting rod mechanism being connected to said lifting support via a connecting member passing through said first guide groove;
said connecting rod mechanism being configured to drive said lifting support to move vertically along said first guide groove in said inner housing;
said connecting rod mechanism including a fixed member and a connecting rod, a first end of the connecting rod being connected to the fixed member;
said connecting rod being configured to swing up and down around said end;
said connecting rod mechanism including a second guide groove opened in said connecting rod, a first end of said connecting member being connected to said lifting support and a second end of the connecting member being movably connected to said second guide groove; and
a roller disposed between said connecting member and said second guide groove;
said roller being connected to said connecting member through a connecting plate and being clamped in said second guide groove.

2. The liftable baking net structure for an oven according to claim 1, further comprising:
a positioning mechanism having a rod-shaped handle and a positioning plate;
said positioning plate including a positioning groove opened in said positioning plate along a swing path of said connecting rod;
said rod-shaped handle passing through said positioning groove to be connected to said connecting rod;
said positioning groove having two lateral sides, each lateral side having a wave form and being symmetrical;
said rod-shaped handle including a fixed rod and a telescopic rod;
said fixed rod being fixedly connected to said connecting rod;
an end of said telescopic rod being movably connected to said fixed rod for telescopic movement;
said telescopic rod including a first shaft section and a second shaft section, said second shaft section having a shaft diameter different from a shaft diameter of said first shaft section;
said shaft diameter of said first shaft section being less than a minimum distance between said two lateral sides of said positioning groove;
said shaft diameter of said second shaft section being greater than said minimum distance between said two lateral sides of said positioning groove and being less than a maximum distance between said two lateral sides of said positioning groove;
said second shaft section being clamped into and fixed between said wave forms of said two lateral sides;
said handle being clamped in said positioning groove.

3. The liftable baking net structure for an oven according to claim 2, further comprising:
a third guide groove and a limiting member provided at a connection between said fixed rod and said telescopic rod;
said limiting member being slidably arranged in said third guide groove.

4. The liftable baking net structure for an oven according to claim 1, wherein said first guide groove is respectively opened in each of both sides of said inner housing, and said connecting rod mechanism is respectively mounted on each of both sides outside said inner housing.

5. The liftable baking net structure for an oven according to claim 4, wherein said fixed member is a rotating rod, said rotating rod is rotatably mounted behind said inner housing, and said connecting rods of said connecting rod mechanism on the two sides outside said inner housing are fixedly connected to said rotating rod to enable said connecting rod on the two sides outside said inner housing to synchronously swing.

6. The liftable baking net structure for an oven according to claim 1, further comprising:
a baking tray support having two sides;
fourth guide grooves respectively opened in said two sides of the baking tray support;
said lifting support including a guiderail bar disposed facing a front end surface of said inner housing; and
a limiting post is disposed on said guiderail bar;
said baking tray support being movably connected to said guiderail bar via a fit between said fourth guide grooves and said limiting post.

7. The liftable baking net structure for an oven according to claim 6, further comprising:
- a clamp head disposed at an upper portion of said limiting post;
- said clamp head having a width greater than that of said fourth guide grooves, a wide hole being provided in a front end of said fourth guide grooves, said wide hole having a width greater than a width of said clamp head.

* * * * *